(12) United States Patent
Lin et al.

(10) Patent No.: US 10,187,290 B2
(45) Date of Patent: Jan. 22, 2019

(54) METHOD, SYSTEM, AND APPARATUS FOR PREVENTING TROMBONING IN INTER-SUBNET TRAFFIC WITHIN DATA CENTER ARCHITECTURES

(71) Applicant: Juniper Networks, Inc., Sunnyvale, CA (US)

(72) Inventors: Wen Lin, Andover, MA (US); John E. Drake, Pittsburgh, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 357 days.

(21) Appl. No.: 15/079,250

(22) Filed: Mar. 24, 2016

(65) Prior Publication Data

US 2017/0279705 A1   Sep. 28, 2017

(51) Int. Cl.
  *H04L 12/751*   (2013.01)
  *H04L 12/721*   (2013.01)

(52) U.S. Cl.
  CPC ............ *H04L 45/02* (2013.01); *H04L 45/025* (2013.01); *H04L 45/72* (2013.01)

(58) Field of Classification Search
  CPC ........ H04L 45/02; H04L 45/025; H04L 45/72
  See application file for complete search history.

(56) References Cited

U.S. PATENT DOCUMENTS

| | | | | |
|---|---|---|---|---|
| 9,742,586 | B2 * | 8/2017 | Yang .................... | H04L 12/462 |
| 2009/0109889 | A1 * | 4/2009 | Budampati ......... | H04L 12/1895 |
| | | | | 370/312 |
| 2014/0112122 | A1 * | 4/2014 | Kapadia ................. | H04L 45/74 |
| | | | | 370/219 |
| 2014/0258485 | A1 * | 9/2014 | Yang ....................... | H04L 41/12 |
| | | | | 709/223 |
| 2015/0312134 | A1 | 10/2015 | Kapadia et al. | |
| 2016/0134526 | A1 * | 5/2016 | Maino ................... | H04L 45/505 |
| | | | | 709/226 |

OTHER PUBLICATIONS

Deploy a VXLAN Network with an MP-BGP EVPN Control Plane White Paper, http://www.cisco.com/c/en/us/products/collateral/switches/nexus-7000-series-switches/white-paper-c11-735015.html, as accessed Feb. 2, 2016, (on or before Jun. 29, 2015).

(Continued)

*Primary Examiner* — Ian N Moore
*Assistant Examiner* — Latresa A McCallum
(74) *Attorney, Agent, or Firm* — FisherBroyles, LLP

(57) ABSTRACT

The disclosed computer-implemented method for preventing tromboning in inter-subnet traffic within data center architectures may include (1) detecting, at a leaf node of a data center, a route advertisement that advertises a route to a spine node of another data center that interfaces with the data center, (2) identifying, at the leaf node, an IP identifier of the spine node included in the route advertisement, (3) determining, at the leaf node, that the route corresponds to the spine node based at least in part on the IP identifier identified in the route advertisement, and then in response to determining that the route corresponds to the spine node, (4) rejecting the route to the spine node at the leaf node such that the leaf node does not learn the route to the spine node. Various other methods, systems, and apparatuses are also disclosed.

16 Claims, 5 Drawing Sheets

(56) References Cited

OTHER PUBLICATIONS

A. Sajassi, et al., BGP MPLS Based Ethernet VPN , draft-ietf-l2vpn-evpn-11, https://tools.ietf.org/html/draft-ietf-l2vpn-evpn-11, as accessed Feb. 2, 20216, Network Working Group, (Oct. 18, 2014).

VXLAN Network with MP-BGP EVPN Control Plane Design Guide, http://www.cisco.com/c/en/us/products/collateral/switches/nexus-9000-series-switches/guide-c07-734107.html, as accessed Feb. 2, 2016, (on or before Apr. 22, 2016).

Shen N. et al.; IS-IS Routing for Spine-Leaf Topology; Internet Engineering Task Force, IETF; Geneva, Switzerland; Nov. 3, 2015.

\* cited by examiner

METHOD, SYSTEM, AND APPARATUS FOR PREVENTING TROMBONING IN INTER-SUBNET TRAFFIC WITHIN DATA CENTER ARCHITECTURES

BACKGROUND

In data center architectures, a network core may connect multiple data centers to one another. This network core may facilitate the flow of inter-subnet traffic from one data center to another. For example, a leaf node within a first data center may transfer inter-subnet traffic to a spine node within a second data center via a network core. In one example, the spine node within the second data center may inefficiently return the inter-subnet traffic to the leaf node (or another leaf node) within the first data center. This routing inefficiency is sometimes referred to as tromboning.

Unfortunately, tromboning may trigger a number of negative effects within the data centers. First, tromboning may lead to increased network latency across the network core and/or within the data centers. Second, tromboning may lead to congested network links and/or increased bandwidth consumption across the network core and/or within the data centers. Third, tromboning may lead to slower Internet access due to the increased network latency, congested network links, and/or increased bandwidth consumption.

The instant disclosure, therefore, identifies and addresses a need for additional and improved methods, systems, and apparatuses for preventing tromboning in inter-subnet traffic within data center architectures.

SUMMARY

As will be described in greater detail below, the instant disclosure generally relates to methods, systems, and apparatuses for preventing tromboning in inter-subnet traffic within data center architectures. In one example, a method for accomplishing such a task may include (1) detecting, at a leaf node of a data center, a route advertisement that advertises a route to a spine node of another data center that interfaces with the data center, (2) identifying, at the leaf node of the data center, an Internet Protocol (IP) identifier of the spine node of the other data center included in the route advertisement, (3) determining, at the leaf node of the data center, that the route corresponds to the spine node of the other data center based at least in part on the IP identifier identified in the route advertisement, and then in response to determining that the route corresponds to the spine node of the other data center, (4) rejecting the route to the spine node of the other data center at the leaf node of the data center such that the leaf node does not learn the route to the spine node of the other data center.

Similarly, a system for implementing the above-described method may include (1) a detection module, stored in memory at a leaf node of a data center, that detects a route advertisement that advertises a route to a spine node of another data center that interfaces with the data center, (2) an identification module, stored in memory at the leaf node of the data center, that identifies an IP identifier of the spine node of the other data center included in the route advertisement, (3) a determination module, stored in memory at the leaf node of the data center, that determines that the route corresponds to the spine node of the other data center based at least in part on the IP identifier identified in the route advertisement, (4) a routing module, stored in memory at the leaf node of the data center, that rejects the route to the spine node of the other data center at the leaf node of the data center such that the leaf node does not learn the route to the spine node of the other data center, and (5) at least one physical processor configured to execute the detection module, the identification module, the determination module, and the routing module.

An apparatus for implementing the above-described method may include (1) a memory device that stores, at a leaf node of a data center, routes that define paths to other nodes within the data center, (2) a processing unit communicatively coupled to the memory device at the leaf of the data center, wherein the processing unit (A) detects a route advertisement that advertises a route to a spine node of another data center that interfaces with the data center, (B) identifies an IP identifier of the spine node of the other data center included in the route advertisement, (C) determines that the route corresponds to the spine node of the other data center based at least in part on the IP identifier identified in the route advertisement and then (4) rejects, in response to the determination that the route corresponds to the spine node of the other data center, the route to the spine node of the other data center such that the leaf node does not learn the route to the spine node of the other data center.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
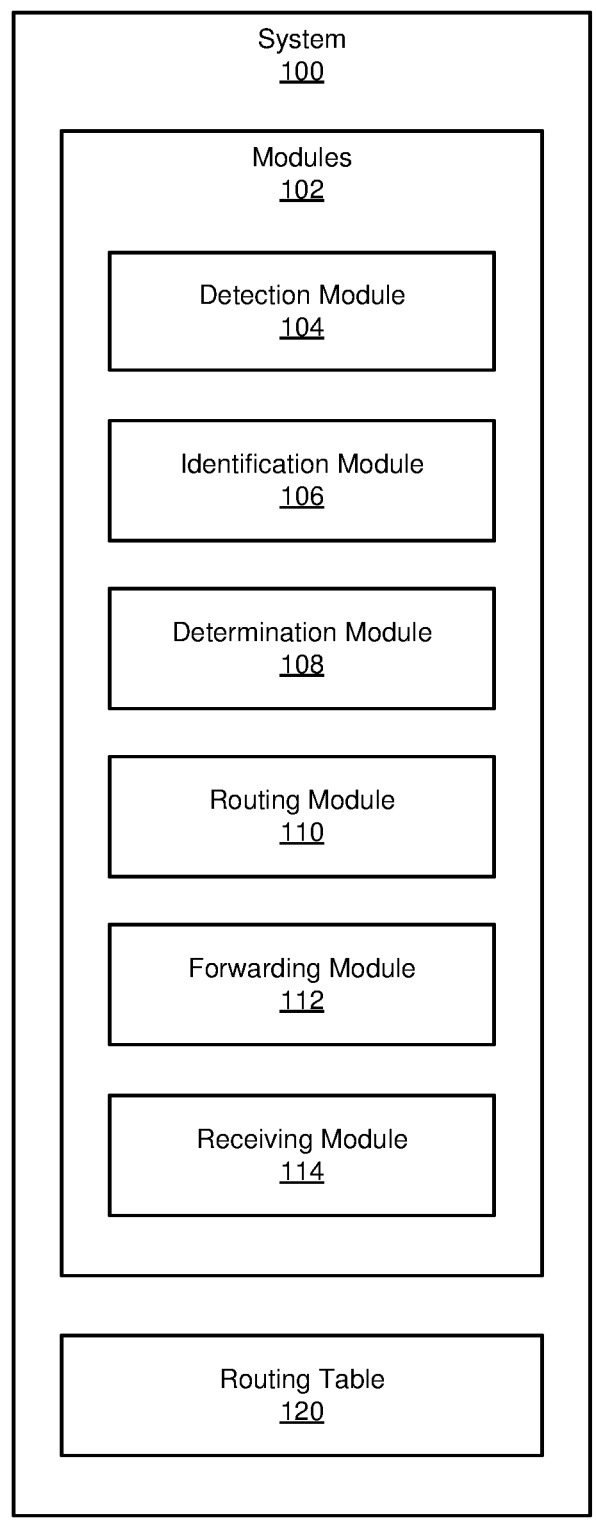
FIG. 1 is a block diagram of an exemplary system for preventing tromboning in inter-subnet traffic within data center architectures.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various methods, systems, and apparatuses for preventing tromboning in inter-subnet traffic within data center architectures. As will be explained in greater detail below, systems and methods of the instant disclosure may enable leaf nodes within a local data center to distinguish between routes to spine nodes within the local data center and routes to spine nodes within a remote data center. By distinguishing between such routes, these systems and methods may direct the leaf nodes to learn the routes to the spine nodes within the local data center and not learn the routes to the spine nodes within the remote data center. As a result, these systems and methods may cause the leaf nodes to always forward inter-subnet traffic destined for another leaf node within the local data center to a spine node within the local data center, as opposed to forwarding such traffic to a spine node within the remote data center that simply returns the traffic to the other leaf node within the local data center, thereby causing a tromboning effect across the data centers.

The term "tromboning" and the phrase "to trombone," as used herein, generally refer to any type or form of suboptimal routing that results in inter-subnet traffic being transferred from a local data center to a remote data center via a network core and then back to the local data center via the network core. The term "data center architecture," as used herein, generally refers to any type or form of network configuration and/or architecture that includes one or more data centers.

Figure 2:
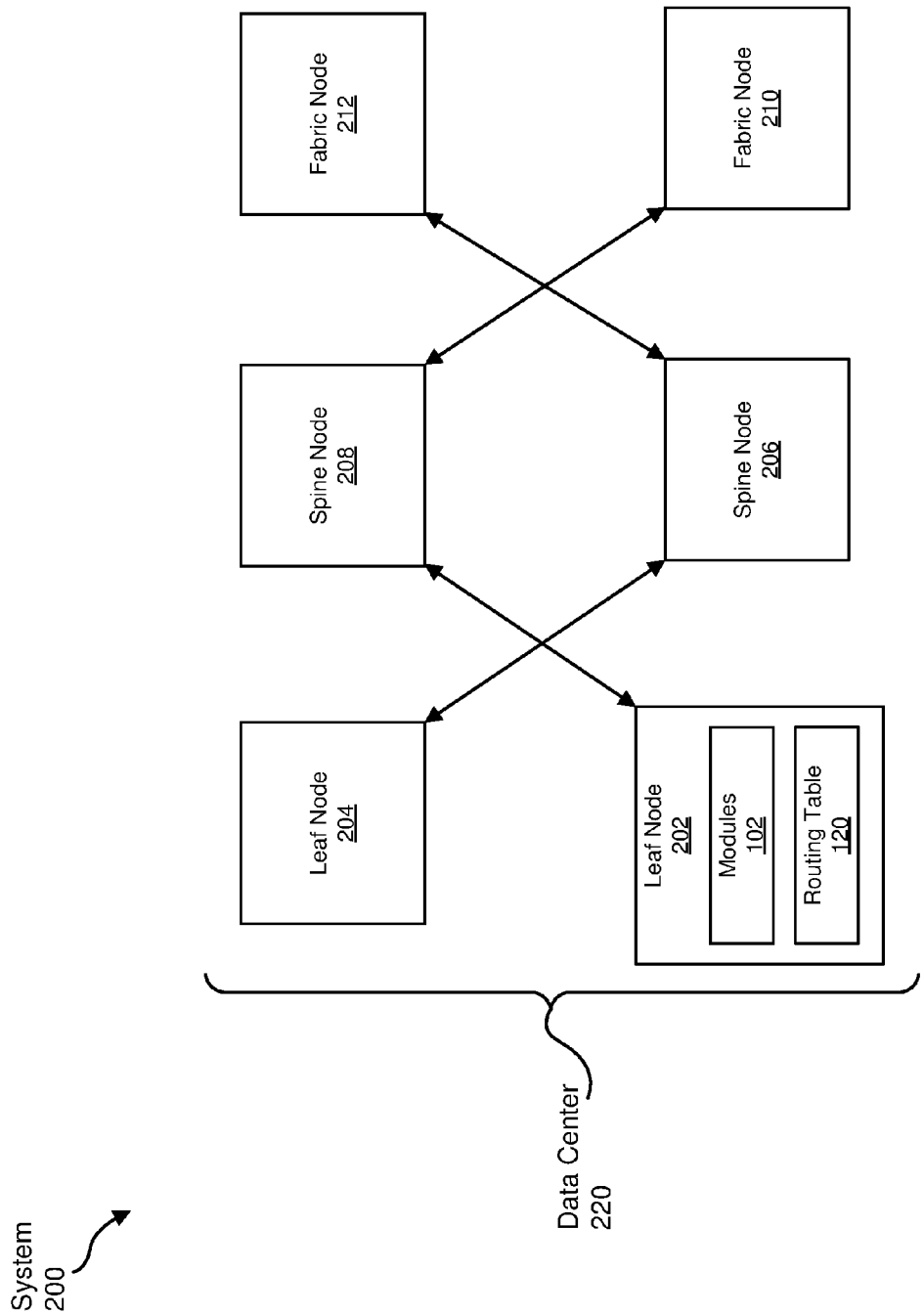
FIG. 2 is a block diagram of an exemplary system for preventing tromboning in inter-subnet traffic within data center architectures.
Figure 3:
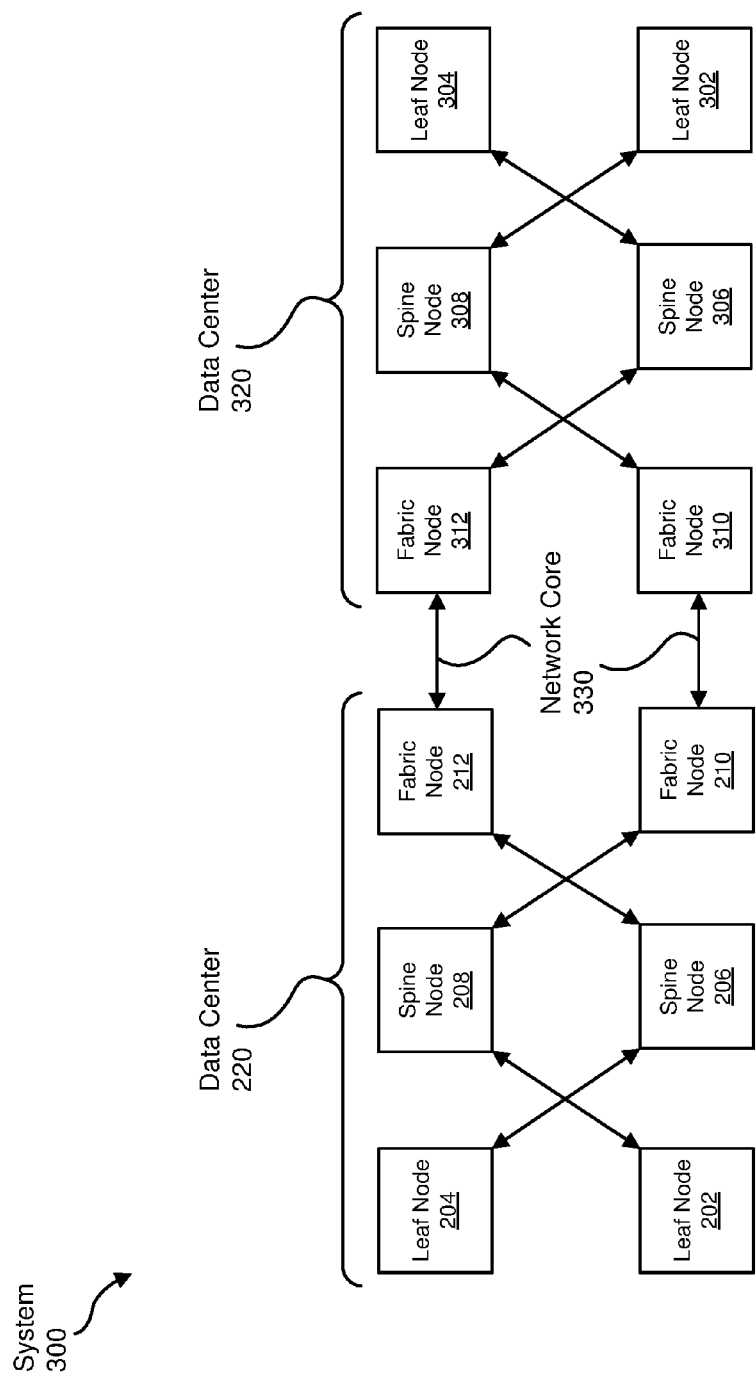
FIG. 3 is a block diagram of an exemplary system for preventing tromboning in inter-subnet traffic within data center architectures.

The following will provide, with reference to FIGS. 1-3, detailed descriptions of exemplary systems for preventing tromboning in inter-subnet traffic within data center architectures. Detailed descriptions of corresponding computer-implemented methods will be provided in connection with FIG. 4. In addition, detailed descriptions of an exemplary computing system capable of implementing one or more of the embodiments described herein will be provided in connection with FIG. 5.

FIG. 1 is a block diagram of an exemplary system 100 for preventing tromboning in inter-subnet traffic within data center architectures. As illustrated in this figure, exemplary system 100 may include one or more modules 102 for performing one or more tasks. For example, and as will be explained in greater detail below, exemplary system 100 may include a detection module 104 that detects, at a leaf node of a data center, a route advertisement that advertises a route to a spine node of another data center that interfaces with the data center. Exemplary system 100 may also include an identification module 106 that identifies, at the leaf node of the data center, an IP identifier of the spine node of the other data center included in the route advertisement. Exemplary system 100 may further include a determination module 108 that determines, at the leaf node of the data center, that the route corresponds to the spine node of the data center based at least in part on the IP identifier identified in the route advertisement.

In addition, and as will be described in greater detail below, exemplary system 100 may include a routing module 110 that rejects the route to the spine node of the other data center such that the leaf node does not learn the route to the spine node of the other data center in response to the determination that the route corresponds to the spine node of the other data center. Moreover, exemplary system 100 may include a forwarding module 112 that forwards a packet to the other leaf node via the route to the spine node of the data center. Finally, exemplary system 100 may include a receiving module 114 that receives, at the leaf node of the data center, a packet from the spine node of the other data center even though the leaf node has not learned the route to the spine node of the other data center. Although illustrated as separate elements, one or more of modules 102 in FIG. 1 may represent portions of a single module or application (such as a network operating system).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as any of the devices illustrated in FIG. 2 (e.g., leaf nodes 202 and 204, spine nodes 206 and 208, and fabric nodes 210 and 212), any of the devices illustrated in FIG. 3 (e.g., leaf nodes 302 and 304, spine nodes 306 and 308, and fabric nodes 310 and 312), and/or computing system 500 in FIG. 5. One or more of modules 102 in FIG. 1 may also represent all or portions of one or more special-purpose computers configured to perform one or more tasks.

As illustrated in FIG. 1, system 100 may also include one or more routing tables, such as routing table 120. In one example, routing table 120 may include and/or represent a plurality of routes that define paths to a plurality of network destinations within a data center or across data centers. The term "path," as used herein, generally refers to any type or form of link and/or series of devices that facilitates communication and/or the flow of traffic between a source and a destination within a data center or across data centers. The term "route," as used herein, generally refers to any type or form of information, data, and/or representation that indicates and/or identifies a path within a data center or across data centers.

Routing table 120 generally represents any type or form of table and/or database that includes, stores, and/or identifies one or more routes. Routing table 120 may include a plurality of routes arranged and/or organized in a variety of ways. Each route may indicate and/or identify various information and/or data representative of a path. Examples of such information and/or data include, without limitation, the IP address of the destination device, the IP address of a gateway device, a routing prefix of the destination or gateway device, a subscriber identifier that identifies a subscriber of a service provider, a community identifier that identifies a community within a network, a route target, the IP address of the next hop, a network mask, combinations or variations of one or more of the same, and/or any other suitable information or data.

Exemplary system 100 in FIG. 1 may be implemented in a variety of ways. For example, all or a portion of exemplary system 100 may represent portions of exemplary system 200 in FIG. 2. As shown in FIG. 2, system 200 may include and/or represent a data center 220. In this example, data center 220 may include leaf nodes 202 and 204, spine nodes 206 and 208, and/or fabric nodes 210 and 212. Although FIG. 2 illustrates only leaf nodes 202 and 204, spine nodes 206 and 208, and/or fabric nodes 210 and 212 within data center 220, various other network nodes, computing systems, and/or virtual machines (not illustrated in FIG. 2) may represent part of data center 220 and/or be included in data center 220.

In one example, leaf node 202 may be programmed with one or more of modules 102. In this example, leaf node 202 may include, store, and/or maintain routing table 120. Although not necessarily illustrated in this way in FIG. 2, leaf node 204 may also be programmed with one or more of modules 102. Additionally or alternatively, leaf node 204 may include, store, and/or maintain a routing table.

As another example, all or a portion of exemplary system 100 may represent portions of exemplary system 300 in FIG. 3. As shown in FIG. 3, system 300 may include a data center 320 in communication with data center 220 via a network core 330. In this example, data center 320 may include leaf nodes 302 and 304, spine nodes 306 and 308, and/or fabric nodes 310 and 312. Although FIG. 3 illustrates only leaf nodes 302 and 304, spine nodes 306 and 308, and/or fabric nodes 310 and 312 within data center 320, various other network nodes, computing systems, and/or virtual machines (not illustrated in FIG. 3) may represent part of data center 320 and/or be included within data center 320.

Although not necessarily illustrated in this way in FIG. 3, leaf node 302 may be programmed with one or more of modules 102. In this example, leaf node 302 may include, store, and/or maintain a routing table. Leaf node 304 may also be programmed with one or more of modules 102. Additionally or alternatively, leaf node 304 may include, store, and/or maintain a routing table.

In one example, one or more of modules 102 from FIG. 1 may, when executed by at least one processor of leaf node 202 in FIG. 2, enable leaf node 202 to prevent tromboning in inter-subnet traffic across data centers 220 and 320. For example, and as will be described in greater detail below, one or more of modules 102 may cause leaf node 202 to (1) detect a route advertisement that advertises a route to spine node 306 or 308 of data center 320 that interfaces with data center 220, (2) identify an IP identifier of spine node 306 or 308 included in the route advertisement, (3) determine that the route corresponds to spine node 306 or 308 based at least in part on the IP identifier identified in the route advertisement, and then in response to determining that the route corresponds to spine node 306 or 308, (4) reject the route to spine node 306 or 308 such that leaf node 202 does not learn the route to spine node 306 or 308.

Leaf nodes 202, 204, 302, and/or 304 each generally represent any type or form of device, system, and/or mechanism that facilitates communication and/or network traffic within a data center and/or network. In one example, leaf nodes 202, 204, 302, and/or 304 may each represent a network switch. In this example, leaf nodes 202, 204, 302, and/or 304 may each facilitate and/or support Layer 2 bridging and/or switching. Additionally or alternatively, leaf nodes 202, 204, 302, and/or 304 may each forward Layer 2 traffic. Examples of leaf nodes 202, 204, 302, and/or 304 include, without limitation, switches, hubs, routers, modems, bridges, repeaters, gateways, multiplexers, network adapters, network interfaces, network racks, chasses, servers, computing devices, virtual machines running on one or more of the same, portions of one or more of the same, combinations or variations of one or more of the same, and/or any other suitable leaf nodes.

Spine nodes 206, 208, 306, and/or 308 each generally represent any type or form of device, system, and/or mechanism that facilitates communication and/or network traffic across data centers and/or networks. In one example, spine nodes 206, 208, 306, and/or 308 may each represent a router (such as a gateway router). In this example, spine nodes 206, 208, 306, and/or 308 may each facilitate and/or support Layer 3 routing as well as forward Layer 2 and/or Layer 3 traffic. Additionally or alternatively, spine nodes 206, 208, 306, and/or 308 may each perform routing and gateway functions. Spine nodes 206, 208, 306, and/or 308 may also implement and/or support Ethernet Virtual Private Network (EVPN) functions by way of either MultiProtocol Label Switching (MPLS) encapsulation or Virtual Extensible Local Area Network (VXLAN) encapsulation. Examples of spine nodes 206, 208, 306, and/or 308 include, without limitation, routers, gateways, switches, hubs, modems, bridges, repeaters, multiplexers, network adapters, network interfaces, network racks, chasses, servers, computing devices, virtual machines running on one or more of the same, portions of one or more of the same, combinations or variations of one or more of the same, and/or any other suitable spine nodes.

Fabric nodes 210, 212, 310, and/or 312 each generally represent any type or form of device, system, and/or mechanism capable of establishing and/or forming a physical and/or virtual interconnection between data centers and/or networks. In one example, fabric nodes 210, 212, 310, and 312 may each represent a network switch. In this example, fabric nodes 210, 212, 310, and/or 312 may each support and/or facilitate full mesh overlay tunnels within data center 220 and/or across data centers 220 and 320. For example, fabric nodes 210, 212, 310, and/or 312 may facilitate and/or implement an EVPN over a VXLAN. Additionally or alternatively, fabric nodes 210, 212, 310, and/or 312 may facilitate and/or implement an EVPN over an MPLS network. Examples of fabric nodes 210, 212, 310, and/or 312 include, without limitation, switches, hubs, routers, modems, bridges, repeaters, gateways, multiplexers, network adapters, network interfaces, network racks, chasses, servers, computing devices, virtual machines running on one or more of the same, portions of one or more of the same, combinations or variations of one or more of the same, and/or any other suitable leaf nodes.

Network core 330 generally represents any type or form of network interconnection, path, and/or link that interfaces data centers and/or networks with one another. In one example, network core 330 may include and/or represent one or more VXLAN and/or MPLS links and/or cables that facilitate communication across and/or between data centers 220 and 320. In this example, network core 330 may enable leaf node 202 to establish a VXLAN and/or MPLS tunnel to one or more of leaf nodes 302 and 304 and/or spine nodes 306 and 308 within data center 320.

Data centers 220 and 320 each generally represent any type or form of centralized physical and/or virtual facility capable of storing, managing, and/or transferring data for a specific purpose. In one example, data centers 220 and 320 may each include and/or implement a multi-stage (e.g., a 5-stage) Clos network. In this example, data centers 220 and 320 may each originate and/or transfer inter-subnet and/or inter-Virtual Local Area Network (VLAN) traffic.

Figure 4:
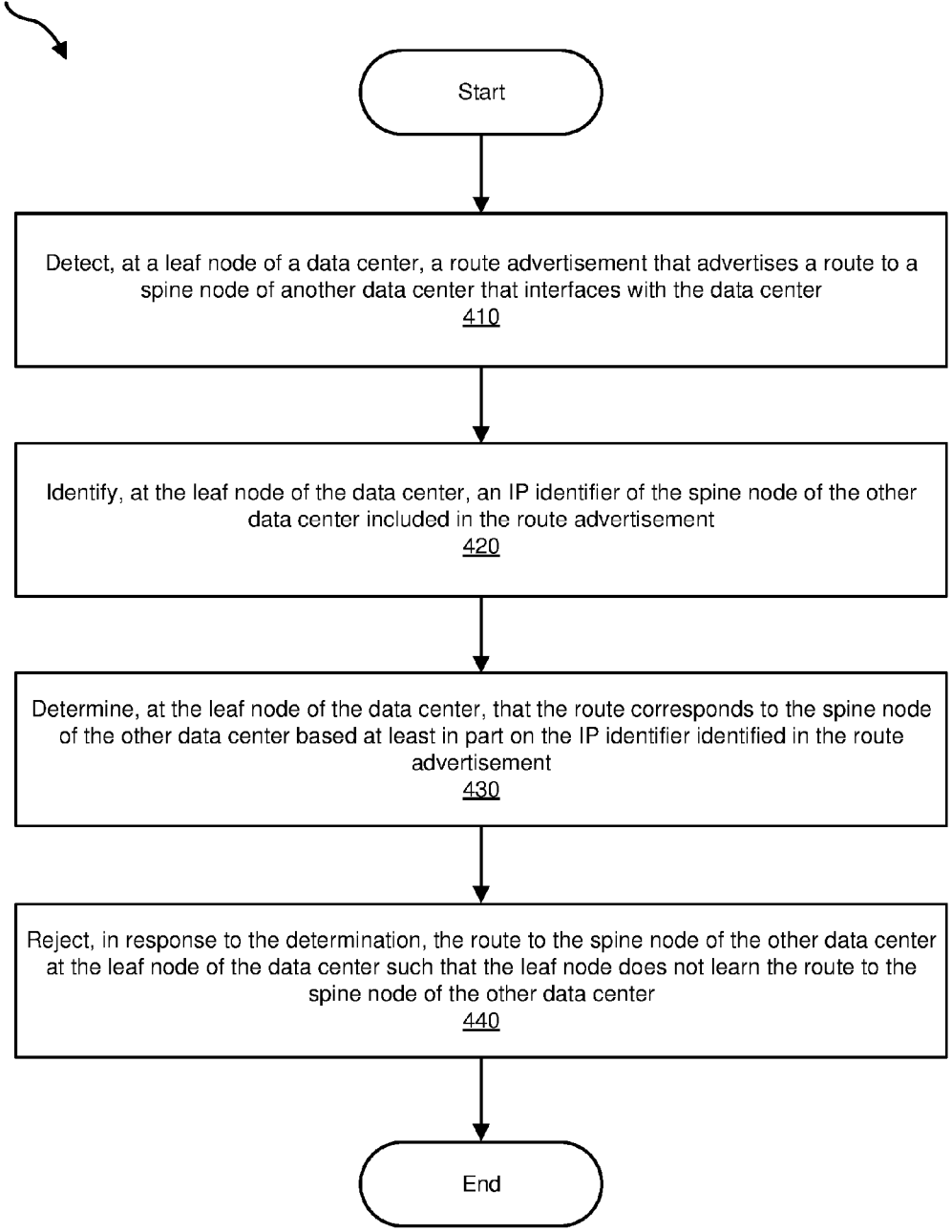
FIG. 4 is a flow diagram of an exemplary method for preventing tromboning in inter-subnet traffic within data center architectures.

FIG. 4 is a flow diagram of an exemplary computer-implemented method 400 for preventing tromboning in inter-subnet traffic within data center architectures. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, and/or computing system 500 in FIG. 5.

As illustrated in FIG. 4, at step 410 one or more of the systems described herein may detect, at a leaf node of a data center, a route advertisement that advertises a route to a spine node of another data center that interfaces with the data center. For example, detection module 104 may, as part of leaf node 202, detect a route advertisement that advertises a route to spine node 306 or 308 of data center 320. In one example, the route advertisement may include and/or represent a type-1 or type-2 advertisement. Additionally or alternatively, the route advertisement may advertise and/or identify a per EVPN routing and forwarding Instance (EVI)

Auto-Discovery (A-D) route for a single-homed or multi-homed Ethernet Segment Identifier (ESI) of the Media Access Control (MAC) address for an Integrated Routing and Bridging (IRB) interface on spine node 306 or 308. Examples of the type of route advertised in the route advertisement include, without limitation, Ethernet A-D routes, MAC-advertisement routes, inclusive multicast routes, Ethernet segment routes, IP prefix routes, Border Gateway Protocol (BGP) routes, combinations or variations of one or more of the same, and/or any other suitable type of route.

The systems described herein may perform step 410 in a variety of ways and/or contexts. In some examples, detection module 104 may detect the route advertisement while monitoring for new and/or updated routes being advertised by nodes within data centers 220 and 320. For example, spine node 306 or 308 within data center 320 may generate a route advertisement that advertises the route to spine node 306 or 308. In this example, spine node 306 or 308 may transmit, multicast, and/or broadcast this route advertisement to data center 220 via network core 330. As the route advertisement reaches leaf node 202 within data center 220, detection module 104 may receive and/or detect the route advertisement.

Returning to FIG. 4, at step 420 one or more of the systems described herein may identify, at the leaf node of the data center, an IP identifier of the spine node of the other data center included in the route advertisement. For example, identification module 106 may, as part of leaf node 202, identify an IP identifier of spine node 306 or 308 included in the route advertisement. Examples of IP identifiers include, without limitation, IP addresses (such as anycast IP addresses and/or Virtual Tunnel End Point (VTEP) IP addresses), route distinguishers, route targets, MAC addresses, combinations or variations of one or more of the same, and/or any other suitable type of IP identifier.

The systems described herein may perform step 420 in a variety of ways and/or contexts. In some examples, identification module 106 may identify the IP identifier by analyzing the route advertisement. For example, identification module 106 may parse the route advertisement and/or search the same for any IP identifiers. While parsing and/or searching the route advertisement, identification module 106 may identify one or more IP identifiers within the route advertisement.

In some examples, one or more of the IP identifiers identified within the route advertisement may correspond to multiple nodes within data centers 220 and 320. For example, identification module 106 may identify an IP identifier within the route advertisement that is not unique to spine node 306 or 308. Instead, this IP identifier may correspond to all of spine nodes 206, 208, 306, and 308.

However, one or more of the IP identifiers identified within the route advertisement may be specific and/or unique to the node whose route is being advertised. For example, identification module 106 may identify an IP identifier within the route advertisement that is specific and/or unique to spine node 306. In other words, this IP identifier may have a one-to-one relationship with spine node 306.

Returning to FIG. 4, at step 430 one or more of the systems described herein may determine, at the leaf node of the data center, that the route corresponds to the spine node of the other data center based at least in part on the IP identifier identified in the route advertisement. For example, determination module 108 may, as part of leaf node 202, determine that the route corresponds to spine node 306 or 308 of data center 320 based at least in part on the IP identifier identified in the route advertisement. In other words, determination module 108 may determine that this route defines a path to spine node 306 or 308 of data center 320 via network core 330.

The systems described herein may perform step 430 in a variety of ways and/or contexts. In some examples, determination module 108 may determine that the route corresponds to one of the spine nodes within data center 320 by comparing the IP identifier identified in the route advertisement against a list. For example, determination module 108 may compare the IP identifier identified in the route advertisement to a blacklist of IP identifiers known to correspond to the spine nodes of data center 320. Upon comparing the IP identifier identified in the route advertisement to the blacklist in this way, determination module 108 may determine that the IP identifier identified in the route advertisement matches one of the IP identifiers from the blacklist. As a result, determination module 108 may determine that the route advertised in the route advertisement leads to one of the spine nodes within data center 320, as opposed to one of the spine nodes within data center 220.

As a specific example, identification module 106 may identify a next-hop IP address within the route advertisement. Determination module 108 may then compare this next-hop IP address to a list that includes and/or identifies the next-hop IP addresses of spine nodes 306 and 308 within data center 320. Upon comparing the next-hop IP address identified within the route advertisement to the list in this way, determination module 108 may determine that this next-hop IP address is included and/or identified in the list. As a result, determination module 108 may determine that leaf node 202 is not to learn the route advertised within this route advertisement.

As another example, identification module 106 may identify a community identifier and/or route target within the route advertisement. For example, spine node 306 or 308 may include and/or insert a community identifier and/or route target into the route advertisement. In this example, the community identifier and/or route target may identify and/or indicate data center 320 as being the origin of the route advertisement. As a result, determination module 108 may determine that leaf node 202 is not to learn the route advertised within this route advertisement.

With respect to these examples, determination module 108 may make these determinations in an effort to avoid tromboning traffic back and forth across network core 330. In other words, since leaf node 202 is unable to learn such routes, leaf node 202 may be unable to forward traffic to the spine nodes within data center 320. As a result, leaf node 202 may be limited to selecting one of spine nodes 206 and 208 within data center 220 to facilitate Layer 3 routing, thereby preventing the tromboning of traffic destined for computing systems attached to leaf node 204 within data center 220.

Returning to FIG. 4, at step 440 one or more of the systems described herein may reject the route to the spine node of the other data center at the leaf node such that the leaf node does not learn the route to the spine node of the other data center. For example, routing module 110 may, as part of leaf node 202, reject the route advertised in the route advertisement in response to the determination that the route corresponds to one of the spine nodes within data center 320. As a result of this rejection, leaf node 202 may fail to learn the route to that spine node within data center 320.

The systems described herein may perform step 440 in a variety of ways and/or contexts. In some examples, routing module 110 may reject the route by refusing to add the route to routing table 120 included in leaf node 202. For example, routing module 110 may direct leaf node 202 to disregard and/or ignore the route advertised in the route advertisement. As a result of this directive, leaf node 202 may be unable to learn the route advertised in the route advertisement. By refusing to add the route to routing table 120 in this way, routing module 110 may force leaf node 202 to forward traffic destined for leaf node 204 to spine node 206 or 208 within data center 220.

In other words, routing module 110 may prevent leaf node 202 from forwarding traffic destined for leaf node 204 via spine node 306 or 308 within data center 320. Accordingly, routing module 110 may ensure that leaf node 202 does not forward traffic to leaf node 204 via the route to spine node 306 or 308 within data center 320. For example, identification module 106 may, at leaf node 202, identify a packet to be forwarded to a computing system (such as a virtual machine) attached to leaf node 204 of data center 220. In this example, identification module 106 may identify a route to spine node 206 or 208 of data center 220. Leaf node 202 may have learned this route earlier since this route is to spine node 206 or 208 of data center 220 and not to spine node 306 or 308 of data center 320.

Once this route has been identified, one or more of the systems described herein may forward the packet to leaf node 204 via the route to spine node 306 or 308. For example, forwarding module 112 may, as part of leaf node 202, forward the packet to leaf node 204 via the route to spine node 206 or 208. More specifically, forwarding module 112 may forward the packet to spine node 206 or 208 of data center 220. Upon receiving the packet, spine node 206 or 208 may in turn forward the packet to leaf node 204. By forwarding the packet to spine node 206 or 208 in this way, forwarding module 112 may ensure that the packet does not traverse spine node 306 or 308 of data center 320 en route to leaf node 204.

In some examples, leaf node 202 may facilitate and/or support Layer 2 bridging and/or switching within data center 220. For example, identification module 106 may identify a packet from a source virtual machine attached to leaf node 202. Identification module 106 may then determine, based at least in part on the packet's destination IP address, that the packet is destined for a virtual machine attached to leaf node 204 within data center 220. In the event that the source virtual machine and the destination virtual machine are included in the same subnetwork, forwarding module 112 may be able to forward the packet from leaf node 202 directly to leaf node 204 by way of Layer 2 bridging and/or switching. However, in the event that the source virtual machine and the destination virtual machine are included in different subnetworks, forwarding module 112 may be unable to forward the packet from leaf node 202 directly to leaf node 204 by way of Layer 2 bridging and/or switching.

Continuing with this example, leaf node 202 may be unable to facilitate and/or support Layer 3 routing within data center 220 or across data centers 220 and 320. In contrast, spine nodes 206 and 208 may each be able to facilitate and/or support Layer 3 routing within data center 220 or across data centers 220 and 320. As a result, in the event that the source virtual machine and the destination virtual machine are included in different subnetworks, leaf node 202 may rely on spine node 206 or 208 to facilitate Layer 3 routing of the packet. Since routing module 110 has rejected the routes to spine nodes 306 and 308, identification module 106 may be limited to selecting a route to spine node 206 or 208 within data center 220. Upon selection of the route, forwarding module 112 may assign the MAC address of the corresponding spine node to the packet and then forward the packet to that spine node.

Upon receiving the packet from leaf node 202, the spine node may look up the Layer 3 route that corresponds to leaf node 204 in the spine node's routing table based at least in part on the packet's destination IP address. During this lookup, the spine node may identify the Layer 3 route that corresponds to leaf node 204. This Layer 3 route may identify and/or indicate the bridge domain associated with the subnetwork that includes the destination virtual machine. The spine node may then forward the packet to the destination virtual machine via leaf node 204 in accordance with the Layer 3 route identified in the routing table.

Although leaf node 202 may be unable to forward traffic directly to spine nodes 306 and 308 within data center 320, leaf node 202 may be able to receive traffic directly from spine nodes 306 and 308. In one example, one or more of the systems described herein may receive a packet from spine node 306 or 308 at leaf node 202 even though leaf node 202 has not learned the route to either of spine nodes 306 and 308. For example, receiving module 114 may, as part of leaf node 202, receive a packet from spine node 306 or 308 even though leaf node 202 has not learned the route to either of spine nodes 306 and 308. In this example, the packet may have originated from a computing system (such as a virtual machine) attached to leaf node 302 or 304 within data center 320. Upon receipt of the packet at leaf node 202, forwarding module 112 may forward the packet to a computing system (such as a virtual machine) attached to leaf node 202.

As explained above in connection with FIGS. 1-4, leaf nodes handling traffic within a data center architecture may distinguish between routes to spine nodes within a local data center and routes to spine nodes within a remote data center. By distinguishing between such routes, these leaf nodes may learn the routes to the spine nodes within the local data center and reject the routes to the spine nodes within the remote data center. As a result, these leaf nodes may always forward inter-subnet traffic destined for another leaf node within the local data center to a spine node within the local data center, as opposed to forwarding such traffic to a spine node within the remote data center. By doing so, these leaf nodes may prevent traffic from tromboning across the data centers, thereby decreasing network latency, decongesting network links, decreasing bandwidth consumption, and/or increasing Internet access speeds.

Figure 5:
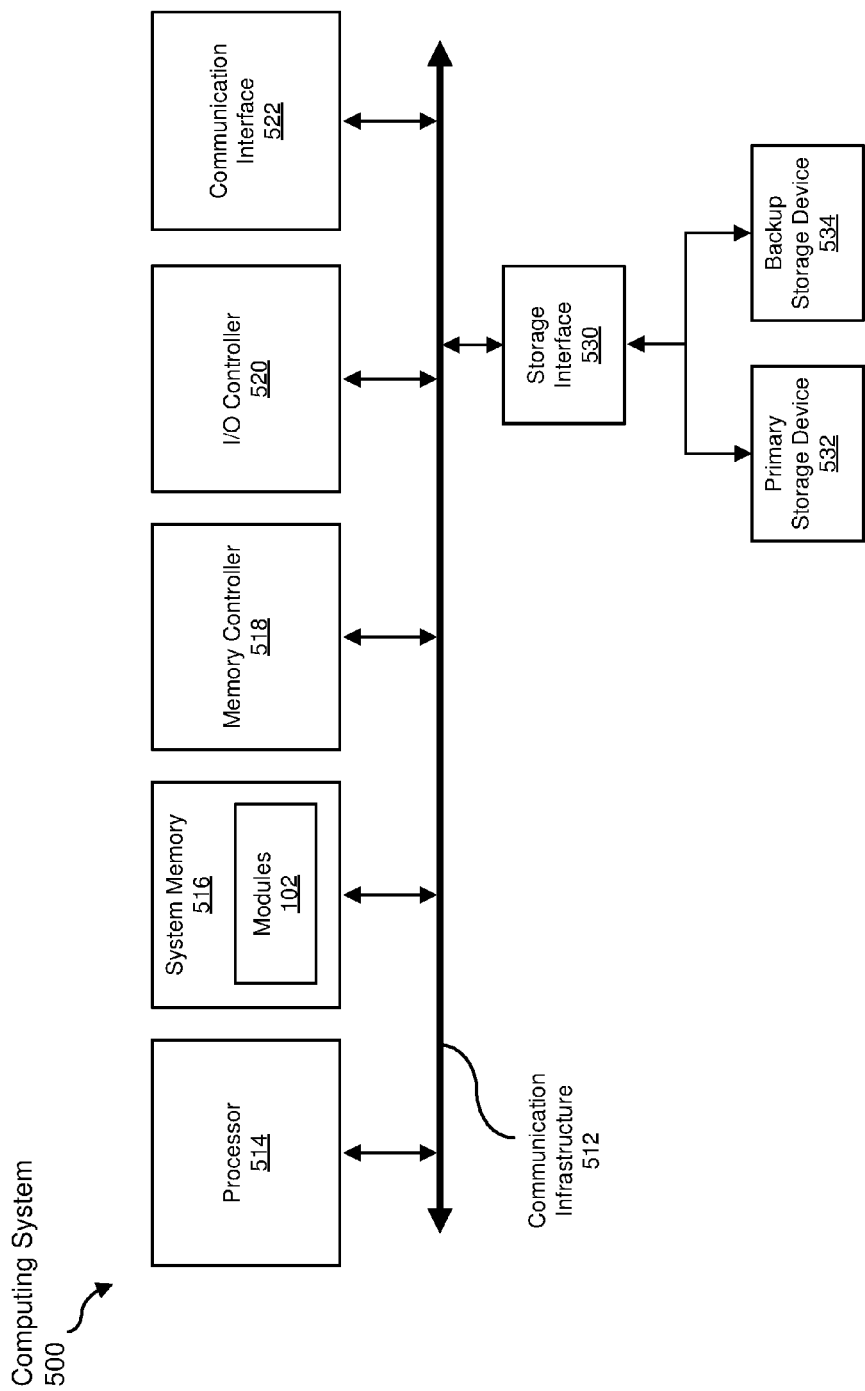
FIG. 5 is a block diagram of an exemplary computing system capable of implementing and/or being used in connection with one or more of the embodiments described and/or illustrated herein.

FIG. 5 is a block diagram of an exemplary computing system 500 capable of implementing and/or being used in connection with one or more of the embodiments described and/or illustrated herein. In some embodiments, all or a portion of computing system 500 may perform and/or be a means for performing, either alone or in combination with other elements, one or more of the steps described in connection with FIG. 3. All or a portion of computing system 500 may also perform and/or be a means for performing and/or implementing any other steps, methods, or processes described and/or illustrated herein. In one example, computing system 500 may include and/or represent an apparatus that performs and/or constitutes a means for performing and/or implementing any other steps, methods, or processes described and/or illustrated herein.

Computing system 500 broadly represents any type or form of electrical load, including a single or multi-processor computing device or system capable of executing computer-readable instructions. Examples of computing system 500 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 500 may be programmed, configured, and/or otherwise designed to comply with one or more networking protocols. According to certain embodiments, computing system 500 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 500 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 500 may include various network and/or computing components. For example, computing system 500 may include at least one processor 514 and a system memory 516. Processor 514 generally represents any type or form of processing unit capable of processing data or interpreting and executing instructions. For example, processor 514 may represent an application-specific integrated circuit (ASIC), a system on a chip (e.g., a network processor), a hardware accelerator, a general purpose processor, and/or any other suitable processing element.

Processor 514 may process data according to one or more of the networking protocols discussed above. For example, processor 514 may execute or implement a portion of a protocol stack, may process packets, may perform memory operations (e.g., queuing packets for later processing), may execute end-user applications, and/or may perform any other processing tasks.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 500 may include both a volatile memory unit (such as, for example, system memory 516) and a non-volatile storage device (such as, for example, primary storage device 532, as described in detail below). System memory 516 may be implemented as shared memory and/or distributed memory in a network device. Furthermore, system memory 516 may store packets and/or other information used in networking operations. In one example, system memory 616 may include and/or store one or more of modules 102 from FIG. 1.

In certain embodiments, exemplary computing system 500 may also include one or more components or elements in addition to processor 514 and system memory 516. For example, as illustrated in FIG. 5, computing system 500 may include a memory controller 518, an Input/Output (I/O) controller 520, and a communication interface 522, each of which may be interconnected via communication infrastructure 512. Communication infrastructure 512 generally represents any type or form of infrastructure capable of facilitating communication between one or more components of a computing device. Examples of communication infrastructure 512 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 518 generally represents any type or form of device capable of handling memory or data or controlling communication between one or more components of computing system 500. For example, in certain embodiments memory controller 518 may control communication between processor 514, system memory 516, and I/O controller 520 via communication infrastructure 512. In some embodiments, memory controller 518 may include a Direct Memory Access (DMA) unit that may transfer data (e.g., packets) to or from a link adapter.

I/O controller 520 generally represents any type or form of device or module capable of coordinating and/or controlling the input and output functions of a computing device. For example, in certain embodiments I/O controller 520 may control or facilitate transfer of data between one or more elements of computing system 500, such as processor 514, system memory 516, communication interface 522, and storage interface 530.

Communication interface 522 broadly represents any type or form of communication device or adapter capable of facilitating communication between exemplary computing system 500 and one or more additional devices. For example, in certain embodiments communication interface 522 may facilitate communication between computing system 500 and a private or public network including additional computing systems. Examples of communication interface 522 include, without limitation, a link adapter, a wired network interface (such as a network interface card), a wireless network interface (such as a wireless network interface card), and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also enable computing system 500 to engage in distributed or remote computing.

For example, communication interface 522 may receive instructions from a remote device or send instructions to a remote device for execution.

As illustrated in FIG. 5, exemplary computing system 500 may also include a primary storage device 532 and/or a backup storage device 534 coupled to communication infrastructure 512 via a storage interface 530. Storage devices 532 and 534 generally represent any type or form of storage device or medium capable of storing data and/or other computer-readable instructions. For example, storage devices 532 and 534 may represent a magnetic disk drive (e.g., a so-called hard drive), a solid state drive, a floppy disk drive, a magnetic tape drive, an optical disk drive, a flash drive, or the like. Storage interface 530 generally represents any type or form of interface or device for transferring data between storage devices 532 and 534 and other components of computing system 500.

In certain embodiments, storage devices 532 and 534 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 534 may also include other similar structures or devices for allowing computer software, data, or other computer-readable instructions to be loaded into computing system 500. For example, storage devices 532 and 534 may be configured to read and write software, data, or other computer-readable information. Storage devices 532 and 534 may be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from those shown in FIG. 5. Computing system 500 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
  detecting, at a leaf node of a data center, a route advertisement that advertises a route to a spine node of another data center that interfaces with the data center;
  identifying, at the leaf node of the data center, an Internet Protocol (IP) identifier of the spine node of the other data center included in the route advertisement;
  determining, at the leaf node of the data center, that the route corresponds to the spine node of the other data center based at least in part on the IP identifier identified in the route advertisement; and
  in response to determining that the route corresponds to the spine node of the other data center, rejecting the route to the spine node of the other data center at the leaf node of the data center such that the leaf node does not learn the route to the spine node of the other data center;

identifying, at the leaf node of the data center, a packet to be forwarded to another leaf node of the data center;

identifying, at the leaf node of the data center, a route to a spine node of the data center;

ensuring that the leaf node does not forward the packet to the other leaf node via the route to the spine node of the other data center; and forwarding the packet to the other leaf node via the route to the spine node of the data center.

2. The method of claim 1, wherein forwarding the packet to the other leaf node via the route to the spine node of the data center comprises ensuring that the packet does not traverse the spine node of the other data center en route to the other leaf node.

3. The method of claim 1, wherein rejecting the route to the spine node of the other data center comprises at least one of:

refusing to add, to a routing table of the leaf node of the data center, the route to the spine node of the other data center; and forcing the leaf node of the data center to forward the packet to the other leaf node via the route to the spine node of the data center.

4. The method of claim 1, wherein:

identifying the route to the spine node of the data center comprises:

determining that the other leaf node of the data center is included in a different subnet than the leaf node; and in response to determining that the other leaf node of the data center is included in a different subnet than the leaf node, identifying the route to the spine node of the data center; and forwarding the packet to the other leaf node via the route to the spine node of the data center comprises forwarding the packet to the spine node of the data center to facilitate Layer 3 routing of the packet at the spine node of the data center.

5. The method of claim 1, further comprising:

identifying, at the leaf node of the data center, a packet to be forwarded to a leaf node of the other data center;

identifying, at the leaf node of the data center, a route to a spine node of the data center; and forwarding the packet to the leaf node of the other data center via the route to the spine node of the data center.

6. The method of claim 1, further comprising receiving, at the leaf node of the data center, a packet from the spine node of the other data center even though the leaf node has not learned the route to the spine node of the other data center.

7. The method of claim 6, further comprising forwarding the packet received from the spine node of the other data center to a computing system whose traffic is handled by the leaf node.

8. The method of claim 1, wherein the IP identifier comprises at least one of:

an IP address of the spine node;

a route distinguisher of the route to the spine node;

a route target applied to routes that correspond to the other data center; and a Media Access Control (MAC) address of the spine node.

9. A system comprising:

a detection module, stored in memory at a leaf node of a data center, that detects a route advertisement that advertises a route to a spine node of another data center that interfaces with the data center;

an identification module, stored in memory at the leaf node of the data center, that identifies an Internet Protocol (IP) identifier of the spine node of the other data center included in the route advertisement;

a determination module, stored in memory at the leaf node of the data center, that determines that the route corresponds to the spine node of the other data center based at least in part on the IP identifier identified in the route advertisement;

a routing module, stored in memory at the leaf node of the data center, that rejects the route to the spine node of the other data center at the leaf node of the data center such that the leaf node does not learn the route to the spine node of the other data center;

wherein the identification module:

identifies a packet to be forwarded to another leaf node of the data center; and identifies a route to a spine node of the data center;

wherein the routing module ensures that the leaf node does not forward the packet to the other leaf node via the route to the spine node of the other data center;

further comprising a forwarding module, stored in memory at the leaf node of the data center, that forwards the packet to the other leaf node via the route to the spine node of the data center; and at least one physical processor configured to execute the detection module, the identification module, the determination module, the routing module, and the forwarding module.

10. The system of claim 9, wherein the forwarding module ensures that the packet does not traverse the spine node of the other data center en route to the other leaf node.

11. The system of claim 9, wherein the forwarding module:

refuses to add, to a routing table of the leaf node of the data center, the route to the spine node of the other data center; and forces the leaf node of the data center to forward the packet to the other leaf node via the route to the spine node of the data center.

12. The system of claim 9, wherein:

the determination module determines that the other leaf node of the data center is included in a different subnet than the leaf node;

the identification module identifies the route to the spine node of the data center in response to the determination that the other leaf node of the data center is included in a different subnet than the leaf node; and the forwarding module forwards the packet to the spine node of the data center to facilitate Layer 3 routing of the packet at the spine node of the data center.

13. The system of claim 9, wherein:

the identification module:

identifies, at the leaf node of the data center, a packet to be forwarded to a leaf node of the other data center; and identifies, at the leaf node of the data center, a route to a spine node of the data center;

further comprising a forwarding module, stored in memory at the leaf node of the data center, that forwards the packet to the other leaf node via the route to the spine node of the data center; and wherein the physical processor is further configured to execute the forwarding module.

14. The system of claim 9, further comprising a receiving module, stored in memory at the leaf node of the data center, that receives a packet from the spine node of the other data center even though the leaf node has not learned the route to the spine node of the other data center; and
   wherein the physical processor is further configured to execute the receiving module.

15. The system of claim 14, further comprising a forwarding module, stored in memory at the leaf node of the data center, that forwards the packet received from the spine node of the other data center to a computing system whose traffic is handled by the leaf node; and
   wherein the physical processor is further configured to execute the forwarding module.

16. An apparatus comprising:
   a memory device that stores, at a leaf node of a data center, routes that define paths to other nodes within the data center; and
   a processing unit communicatively coupled to the memory device at the leaf of the data center, wherein the processing unit:
      detects a route advertisement that advertises a route to a spine node of another data center that interfaces with the data center;
      identifies an Internet Protocol (IP) identifier of the spine node of the other data center included in the route advertisement;
      determines that the route corresponds to the spine node of the other data center based at least in part on the IP identifier identified in the route advertisement; and
      rejects, in response to the determination that the route corresponds to the spine node of the other data center, the route to the spine node of the other data center such that the leaf node does not learn the route to the spine node of the other data center;
      identify a packet to be forwarded to another leaf node of the data center;
      identify a route to a spine node of the data center;
      ensure that the leaf node does not forward the packet to the other leaf node via the route to the spine node of the other data center; and
      forward the packet to the other leaf node via the route to the spine node of the data center.

* * * * *